United States Patent
Vandendriessche et al.

(10) Patent No.: US 10,349,581 B2
(45) Date of Patent: Jul. 16, 2019

(54) HARVESTER HEADER SUPPORT

(71) Applicant: CNH Industrial America LLC, New Holland, PA (US)

(72) Inventors: Rik Vandendriessche, Eernegem (BE); Bart M. A. Missotten, Herent (BE); Frederik Tallir, Esen (BE); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/631,560

(22) Filed: Jun. 23, 2017

(65) Prior Publication Data

US 2017/0367266 A1   Dec. 28, 2017

(30) Foreign Application Priority Data

Jun. 23, 2016   (BE) .................................. 2016/5462

(51) Int. Cl.
  *A01D 75/00*   (2006.01)
  *B60P 3/06*    (2006.01)
  *A01D 41/14*   (2006.01)
  *A01B 73/00*   (2006.01)
  *A01D 67/00*   (2006.01)

(52) U.S. Cl.
  CPC .......... *A01D 75/002* (2013.01); *A01D 41/14* (2013.01); *A01D 41/144* (2013.01); *B60P 3/066* (2013.01); *A01B 73/00* (2013.01); *A01D 67/00* (2013.01); *A01D 75/00* (2013.01)

(58) Field of Classification Search
  CPC .... A01D 75/002; A01D 41/144; A01D 41/14; A01D 75/00; A01D 67/00; B60P 3/066; A01B 73/00; A01B 73/005; A01B 73/067
  See application file for complete search history.

(56) References Cited

U.S. PATENT DOCUMENTS

| | | | |
|---|---|---|---|
| 3,683,605 A | | 8/1972 | Jakobi |
| 4,081,946 A | * | 4/1978 | Ehrhart ................ A01D 43/107 56/14.4 |
| 4,084,394 A | * | 4/1978 | van der Lely ......... A01D 41/04 56/14.6 |
| 4,119,329 A | * | 10/1978 | Smith .................... A01B 51/04 172/240 |

(Continued)

FOREIGN PATENT DOCUMENTS

| | | |
|---|---|---|
| DE | 102007035796 A1 | 2/2009 |
| DE | 102011122660 A1 | 6/2013 |

(Continued)

*Primary Examiner* — Arpad Fabian-Kovacs
(74) *Attorney, Agent, or Firm* — Peter K. Zacharias; Patrick M. Sheldrake

(57) ABSTRACT

A header support for supporting a header during road transport of an agricultural harvester. The header support has a header mounted to it in order to reduce a front axle load of the agricultural harvester. During harvesting, a support wheel of the header support is folded upwardly so it does not touch the ground during harvesting. The rotation axis of the support wheel extends in a substantially vertical plane during harvesting. This allows for a simple construction of the header support and reduces the vibration loads on the bearing of the support wheel during harvesting.

12 Claims, 7 Drawing Sheets

(56) References Cited

U.S. PATENT DOCUMENTS

| | | | | |
|---|---|---|---|---|
| 4,986,064 | A * | 1/1991 | Ermacora | A01D 75/002 |
| | | | | 280/415.1 |
| 5,136,828 | A * | 8/1992 | Ermacora | A01B 63/00 |
| | | | | 280/43.23 |
| 5,243,810 | A * | 9/1993 | Fox | A01B 73/005 |
| | | | | 56/14.4 |
| 5,562,167 | A | 10/1996 | Honey | |
| 6,152,240 | A | 11/2000 | Nonhoff et al. | |
| 6,282,875 | B1 | 9/2001 | Holtkotte et al. | |
| 6,374,923 | B1 * | 4/2002 | Friggstad | A01B 73/00 |
| | | | | 172/383 |
| 6,789,379 | B2 * | 9/2004 | Heidjann | A01D 41/12 |
| | | | | 56/10.2 E |
| 6,843,046 | B2 * | 1/2005 | Heidjann | A01D 67/00 |
| | | | | 56/208 |
| 7,430,846 | B2 * | 10/2008 | Bomleny | A01D 41/141 |
| | | | | 56/10.2 E |
| 7,661,251 | B1 * | 2/2010 | Sloan | A01D 41/141 |
| | | | | 56/10.2 E |
| 7,908,838 | B2 * | 3/2011 | Hohlfeld | A01D 43/081 |
| | | | | 56/228 |
| 7,926,249 | B1 * | 4/2011 | Cook | A01B 73/005 |
| | | | | 172/240 |
| 7,971,420 | B1 * | 7/2011 | Bollin | A01D 41/145 |
| | | | | 56/208 |
| 8,910,726 | B2 | 12/2014 | Lammerant et al. | |
| 9,125,343 | B2 * | 9/2015 | Duquesne | A01D 41/16 |
| 9,565,800 | B2 * | 2/2017 | Fay, II | A01D 57/28 |
| 9,775,291 | B2 * | 10/2017 | Neudorf | A01D 41/145 |
| 2003/0019197 | A1 | 1/2003 | Heidjann et al. | |
| 2004/0011538 | A1 * | 1/2004 | Raducha | A01B 59/042 |
| | | | | 172/311 |
| 2005/0028509 | A1 * | 2/2005 | Viaud | A01D 41/148 |
| | | | | 56/341 |
| 2008/0086999 | A1 * | 4/2008 | Tippery | A01B 73/005 |
| | | | | 56/228 |
| 2010/0281837 | A1 * | 11/2010 | Talbot | A01D 41/141 |
| | | | | 56/10.2 E |
| 2014/0041351 | A1 * | 2/2014 | Bollin | A01D 41/127 |
| | | | | 56/10.2 E |
| 2015/0033692 | A1 * | 2/2015 | Schroeder | A01D 34/008 |
| | | | | 56/10.2 E |
| 2015/0068177 | A1 * | 3/2015 | Harkcom | A01D 34/00 |
| | | | | 56/15.5 |
| 2015/0271999 | A1 * | 10/2015 | Enns | G05B 15/02 |
| | | | | 700/275 |
| 2016/0007534 | A1 * | 1/2016 | Fay, II | A01D 75/004 |
| | | | | 56/228 |

FOREIGN PATENT DOCUMENTS

| | | | | |
|---|---|---|---|---|
| DE | 102013209740 | A1 | 11/2014 | |
| EP | 1046329 | A2 | 10/2000 | |
| EP | 1905293 | A1 | 4/2008 | |
| EP | 1932416 | A1 * | 6/2008 | A01B 73/065 |

* cited by examiner

US 10,349,581 B2

HARVESTER HEADER SUPPORT

CROSS REFERENCE TO RELATED APPLICATION

This application claims priority to Belgium Application No. 2016/5462 filed Jun. 23, 2016, the contents of which are incorporated herein by reference.

FIELD OF THE INVENTION

The invention pertains to a harvester header support for supporting a header of an agricultural harvester during road transport, and to a combination of an agricultural harvester with such a harvester header support.

BACKGROUND OF THE INVENTION

Modern agricultural harvesters, such as combine harvesters and forage harvesters, are heavy pieces of machinery, which in many cases have to travel over public roads from one field to another. In many countries regulations exist that prescribe a maximum axle load for vehicles travelling on public roads. The current developments in agricultural harvesters lead to an increase of the axle loads of these harvesters. In particular when a header is attached to the agricultural harvester during road transport, the front axle load can reach levels which are close to or even above the maximum allowable axle load for public roads.

It is known from the prior art to provide one or more support wheels on the front parts of the agricultural harvester. These support wheels are generally connected to the header or to the feeder of the agricultural harvester.

It is known to use support wheels that are in contact with the ground during road transport as well as during the harvesting operation on the field, and alternatively, to use support wheels that are in contact with the ground during road transport or during the harvesting operation on the field.

Generally, it is disadvantageous if the support wheels contact the ground during harvesting, so when the agricultural harvester is driven over the field. Support wheels that contact the ground during harvesting have to be rather large in order to avoid undesired compacting of the ground and the undesired formation of ruts in the field, which is impractical and expensive.

If the support wheels are designed to be in contact with the ground during either road transport or during harvesting (when the harvester is driven over the field), provisions have to be made to avoid ground contact of the support wheels when such ground contact is not desired.

EP1046329 discloses to remove the support wheels entirely when the harvester is made ready for harvesting, and to mount the support wheels again when the harvester is made ready for driving on the road.

WO2010/130745 discloses a harvester which requires the use of support wheels during harvesting, but not during road transport. In this harvester, the support wheels are mounted on a frame which is pivoted inwards, i.e. towards the center line of the harvester parallel to the driving direction of the harvester, when the harvester is made ready for road transport. In this road transport mode, the axis of the support wheels extends substantially parallel to the main driving direction of the harvester, in a substantially horizontal plane. The main driving direction of the harvester is straight ahead.

Removing the support wheels after use and mounting them when they are needed again is highly impractical and labor-intensive. There is limited space available for a frame in the vicinity of the header and/or feeder, and a complex movement may be required to transfer the support wheels from their position during road transport to their position during field operation and/or vice versa. In addition, the bearings of the support wheels may be susceptible of damage caused by vibrations when the support wheels are not in contact with the ground.

SUMMARY OF THE INVENTION

It is the object of the invention to provide an improved harvester header support.

According to the invention, this object is achieved with a harvester header support for supporting a header of an agricultural harvester during road transport, which harvester header support comprises:

a frame, which frame comprises:

a harvester interface, which is connectable to an agricultural harvester, a first arm, which arm is pivotably connected to the harvester interface, a first support wheel which comprises a first rotation axis and a tread, which first support wheel is rotatable around the first rotation axis, a first wheel connector, which is adapted to connect the first support wheel to the first arm of the frame, while allowing the first support wheel to rotate about the first rotation axis, an arm drive, which is adapted to pivot the first arm relative to the harvester interface, in which the harvester header support has a road transport mode and a field operation mode and the arm drive is adapted to transfer the harvester header support from the road transport mode into the field operation mode and/or vice versa, in which road transport mode the first support wheel is in a road transport position which allows the first support wheel to bear at least a part of the weight of the header, and in which road transport position the first rotation axis of the first support wheel extends in a substantially horizontal plane, and wherein in the field operation mode, the first support wheel is in a field operation position in which the first support wheel is free from the weight of the header and in which field operation position the first rotation axis of the first support wheel extends in a substantially vertical plane.

In accordance with the invention, the harvester header support comprises a frame which comprises a harvester interface and a first arm. The harvester interface is connectable to an agricultural harvester. The first arm is pivotably connected to the harvester interface. Optionally, the harvester is adapted to be connected to a feeder and/or to a header of an agricultural harvester.

The harvester header support further comprises a first support wheel. The first support wheel is rotatable about a first rotation axis. The first support wheel comprises a tread, which is adapted to engage the ground when the first support wheel is used during road transport. The frame is adapted to connect the first support wheel to the agricultural harvester.

The harvester header support further comprises a first wheel connector, which is adapted to connect the first support wheel to the first arm of the frame. The first wheel connector allows the first support wheel to rotate about the first rotation axis. For example, the first wheel connector comprises a first shaft with a bearing, which bearing has an inner ring which is fixed to the shaft and an outer ring which is fixed in a central opening of the first support wheel. Alternatively, the first support wheel comprises a shaft which is fixed at the center of the support wheel, and the first wheel support comprises at least one bearing but preferably two bearings. Each bearing has an inner ring and an outer ring. The inner ring of is fixed to the shaft of the first support wheel.

The harvester header support further comprises an arm drive, which is adapted to pivot the first arm relative to the harvester interface.

The harvester header support has a road transport mode and a field operation mode. The arm drive is adapted to transfer the harvester header support from the road transport mode into the field operation mode and/or vice versa. Optionally, this involves moving, e.g. pivoting, the first arm of the frame relative to the harvester interface. In a possible embodiment, the arm drive is adapted to transfer the harvester header support from the road transport mode into the field operation mode as well as from the field operation mode into the road transport mode. Alternatively, one of these transfers is effected partly or entirely by gravity.

In the road transport mode, the first support wheel is in a road transport position. The road transport position allows the first support wheel to bear at least a part of the weight of the header. The reduces the front axle load of the agricultural harvester. In the road transport position, the tread of the first support wheel will usually engage the ground. In the road transport mode, the first rotation axis of the first support wheel extends in a substantially horizontal plane.

In the field operation mode, the first support wheel is in a field operation position in which the first support wheel is free from the weight of the header and in which field operation position the first rotation axis of the first support wheel extends in a substantially vertical plane.

So, when the harvester header support is transferred from the road transport mode to the field operation mode or vice versa, the first support wheel is tilted about a tilt axis which extends in horizontal direction, substantially parallel to the main driving direction of the agricultural harvester—the main driving direction of the agricultural harvester being straight ahead. An advantage of this arrangement is that the frame can be kept very simple and robust. A single pivot in the frame per support wheel suffices to allow the harvester header support to be transferred from the road transport mode to the field operation mode or vice versa. This also makes it possible to keep the arm drive simple and cheap.

Furthermore, in accordance with the invention, the first support wheel is arranged such that the first rotation axis is arranged in a substantially vertical plane when the harvester header support is in the field operation mode. In the field operation mode, the first support wheel is free from the weight of the header, and usually, it will not be in contact with the ground. As a consequence, the first support wheel has to bear hardly any weight, so the bearing or bearings of the first support wheel and/or the first wheel connector that make possible the rotation of the first support wheel about the first rotation axis are not under tension and any roller bodies in them can move within the bearing clearance.

During harvesting, the agricultural harvester is driven over a field, e.g. a corn field or a wheat field, and the uneven terrain of the field causes vibrations in vertical direction. With the harvester header support mounted onto an agricultural harvester, these vibrations are transferred to the first support wheel as well. With the first rotation axis extending in a substantially vertical plane, this vertical vibration load is shared by all the roller bodies in the bearing, and not just borne by a few of them as would be the case if the wheel's rotation axis would be in a horizontal plane. Therewith, the arrangement with the first rotation axis extending in a substantially vertical plane when the harvester header support is in the field operation mode reduces the risk of runway pitting and runway indentation in the bearing or bearing of the first support wheel and/or the first wheel connector. In addition, this reduces the need for using pretensioned bearings for the first support wheel and/or first wheel connector, which reduces the costs of the harvester header support.

The agricultural harvester can for example be a combine harvester or a forage harvester.

In a possible embodiment, the first wheel connector is adapted to allow pivoting of the first support wheel about a pivot axis, which pivot axis in the road transport mode extends in a substantially vertical plane. This allows the first support wheel to follow steering movements on the road of the agricultural harvester to which the harvester header support is connected in use. This reduces the wear of the tread of the first support wheel, and if the tread is part of a tire, it reduces the wear of that tire.

Optionally, the first wheel connector is adapted to allow pivoting of the first support wheel about the pivot axis over a pivot angle which is 10° or less, preferably 5° or less, optionally 3° or less.

Optionally, the main driving direction extends along the bisector of the pivot angle. So, if the pivot angle is for example 10°, the first support wheel can pivot over 5° to the left and over 5° to the right relative to the main driving direction.

If the road transport position of the first support wheel of the harvester header support when used on an agricultural harvester is close to the front wheel or front track of the agricultural harvester, this is sufficient to follow the steering movements of the agricultural harvester. This embodiment allows a simple and robust construction.

In a possible embodiment, the arm drive comprises a hydraulic assembly, which hydraulic assembly comprises a hydraulic cylinder and a fluid line system for feeding hydraulic fluid to the hydraulic cylinder and receiving hydraulic fluid from the hydraulic cylinder. The fluid line system 32 optionally comprises a plurality of fluid lines. The fluid line system comprises a hydraulic connector, which hydraulic connector is adapted to connect the fluid line system to a hydraulic system of the agricultural harvester.

An agricultural harvester typically has an hydraulic system on board. In this embodiment, the hydraulic system of the agricultural harvester can be used to operate the arm drive of the harvester header support. This way, the need for physical handling of the harvester header support, in particular of the first support wheel thereof, by the driver or operator of the agricultural harvester is reduced or even eliminated.

In a possible embodiment, the frame further comprises a second arm, which is pivotably connected to the harvester interface. In this embodiment, the harvester header support further comprises:

a second support wheel, which comprises a second rotation axis and a tread, which second support wheel is rotatable around the second rotation axis, a second wheel connector, which is adapted to connect the second support wheel to the second arm of the frame, while allowing the second support wheel to rotate about the second rotation axis, and in which road transport mode the second support wheel is in a road transport position which allows the second support wheel to bear at least a part of the weight of the header, and in which road transport position the second rotation axis of the second support wheel extends in a substantially horizontal plane, and wherein in field operation mode, the second support wheel is in a field operation position in which the second support wheel is free from the weight of the header and the second rotation axis of the second support wheel extends in a substantially vertical plane.

In this embodiment, the harvester header support comprises two support wheels, which in use for example can be arranged on opposite sides of a header or feeder of an agricultural harvester.

Optionally, the second wheel connector is adapted to allow pivoting of the second support wheel about a pivot axis, which pivot axis in the road transport mode extends in a substantially vertical plane. This allows the second support wheel to follow steering movements on the road of the agricultural harvester to which the harvester header support is connected in use. Optionally, the second wheel connector is adapted to allow pivoting of the second support wheel about the pivot axis over a pivot angle which is 10° or less, preferably 5° or less, optionally 3° or less.

Optionally, in the road transport position the distance between the first support wheel and the second support wheel is 3.5 meters maximum.

Optionally, in the field operation position, the distance between the first support wheel and the second support wheel is larger than the distance between the first support wheel and the second support wheel in the road transport mode.

Optionally, in the road transport position the distance between the first support wheel and the second support wheel is 3.5 meters maximum and in the field operation position, the distance between the first support wheel and the second support wheel is larger than the distance between the first support wheel and the second support wheel in the road transport mode.

The invention further pertains to a combination of an agricultural harvester and a harvester header support according to the invention. The agricultural harvester has a front wheel or front track, and the harvester header support is connected to the agricultural harvester. In the road transport mode, the first support wheel is arranged in front of the front wheel or front track of the agricultural harvester. The indication "front" is regarded in the main driving direction of the agricultural harvester, which main driving direction is straight ahead.

Optionally, the agricultural harvester has a feeder, and the harvester header support is connected to the feeder.

Optionally, the agricultural harvester has a header, and the harvester header support is connected to the header.

The agricultural harvester can for example be a combine harvester or a forage harvester.

In a possible embodiment of the a combination of an agricultural harvester and a harvester header support according to the invention, the agricultural harvester comprises a hydraulic system, and the arm drive of the harvester header support comprises a hydraulic assembly. The hydraulic assembly of the arm drive comprises a hydraulic cylinder and a fluid line system for feeding hydraulic fluid to the cylinder and receiving hydraulic fluid from the hydraulic cylinder. The fluid line system comprises a hydraulic connector, which hydraulic connector is connected to the hydraulic system of the agricultural harvester.

An agricultural harvester typically has an hydraulic system on board. In this embodiment, the hydraulic system of the agricultural harvester can be used to operate the arm drive of the harvester header support. This way, the need for physical handling of the harvester header support, in particular of the first support wheel thereof, by the driver or operator of the agricultural harvester is reduced or even eliminated.

Optionally, the agricultural harvester comprises a foldable header. The foldable header has an unfolded mode in which the foldable header is adapted to be operated for harvesting crop and a folded mode in which the foldable header is adapted for road transport. The foldable header comprises a folding device for bringing the foldable header from the folded mode into the unfolded mode and/or vice versa. The hydraulic system of the agricultural harvester comprises a header folding control valve which is adapted to actuate the folding device. In this variant, the hydraulic connector is connected to the hydraulic system of the agricultural harvester at a location between the header folding control valve and the folding device.

This arrangement allows to use the header folding control valve to operate not only the folding and/or unfolding of the foldable header, but also to transfer the harvester header support from road transportation mode to field operation mode and/or vice versa. This way, no additional valve has to be provided to transfer the harvester header support from road transportation mode to field operation mode and/or vice versa. This arrangement furthermore allows to simultaneously bring the foldable header in the folded mode and to transfer the harvester header support from field operation mode to road transportation mode when the agricultural harvester is prepared for driving on the road. Likewise, this arrangement allows to simultaneously bring the foldable header in the unfolded mode and to transfer the harvester header support from road transportation mode to field operation mode when the agricultural harvester is prepared for harvesting.

In a possible embodiment of the a combination of an agricultural harvester and a harvester header support according to the invention, the combination further comprises a second header harvester support according the invention. So, this case, two separate harvester header supports are provided, each having their own frame including their own harvester interface.

Optionally, the first support wheel of the first header harvester support is located on the right side of the agricultural harvester and the first support wheel of the second header harvester support is located on the left side of the agricultural harvester.

Optionally, both the first support wheel and the second support wheel arranged in front of the front wheel or front track of the agricultural harvester.

In a possible embodiment of the a combination of an agricultural harvester and a harvester header support according to the invention, the frame of the harvester header support further comprises a second arm, which is pivotably connected to the harvester interface. In this embodiment, the harvester header support further comprises a second support wheel, which comprises a second rotation axis and a tread, which second support wheel is rotatable around the second rotation axis, a second wheel connector, which is adapted to connect the second support wheel to the second arm of the frame, while allowing the second support wheel to rotate about the second rotation axis, and in which road transport mode the second support wheel is in a road transport position which allows the second support wheel to bear at least a part of the weight of the header, and in which road transport position the second rotation axis of the second support wheel extends in a substantially horizontal plane, and wherein in field operation mode, the second support wheel is in a field operation position in which the second support wheel is free from the weight of the header and the second rotation axis of the second support wheel extends in a substantially vertical plane.

So, this case, a single separate harvester header support is provided, with a single harvester interface, but with two arms. On each arm, a separate support wheel is mounted by a separate wheel connector.

Optionally, the first support wheel is located on the right side of the agricultural harvester and the second support wheel is located on the left side of the agricultural harvester.

Optionally, both the first support wheel and the second support wheel arranged in front of the front wheel or front track of the agricultural harvester.

The invention further pertains to a combination of a foldable harvester header and a harvester header support according to the invention.

Optionally, in this combination the foldable header has an unfolded mode in which the foldable header is adapted to be operated for harvesting crop and a folded mode in which the foldable header is adapted for road transport. The foldable header comprises a folding device for bringing the foldable header from the folded mode into the unfolded mode and vice versa, and a hydraulic actuator system for operating the folding device. The hydraulic actuator system comprises a header folding control valve which is adapted to actuate the folding device. In this variant, the arm drive of the harvester header support comprises a hydraulic assembly. This hydraulic assembly comprises a hydraulic cylinder and a fluid line system for feeding hydraulic fluid to the cylinder and receiving hydraulic fluid from the hydraulic cylinder. The fluid line system comprises a hydraulic connector. The hydraulic connector of the harvester header support is connected to the hydraulic actuating system at a location between the header folding control valve and the folding device.

BRIEF DESCRIPTION OF THE DRAWINGS

The invention will be described in more detail below under reference to the drawing, in which in a non-limiting manner exemplary embodiments of the invention will be shown.

The drawing in:

FIG. 1 illustrates an example of an agricultural harvester 1 which can be used with a harvester header support according to the invention, in side view.

DETAILED DESCRIPTION OF THE INVENTION

In this example, the agricultural harvester 1 is a combine harvester. The agricultural harvester 1 comprises a header 3, which is adapted to cut crop from the field. The agricultural harvester 1 further comprises a feeder 2, which is adapted to receive crop from the header 3 and to transport the crop further into the agricultural harvester 1. In the agricultural harvester 1, the crop is optionally processed, e.g. cut into smaller pieces and/or threshed.

Figure 1:
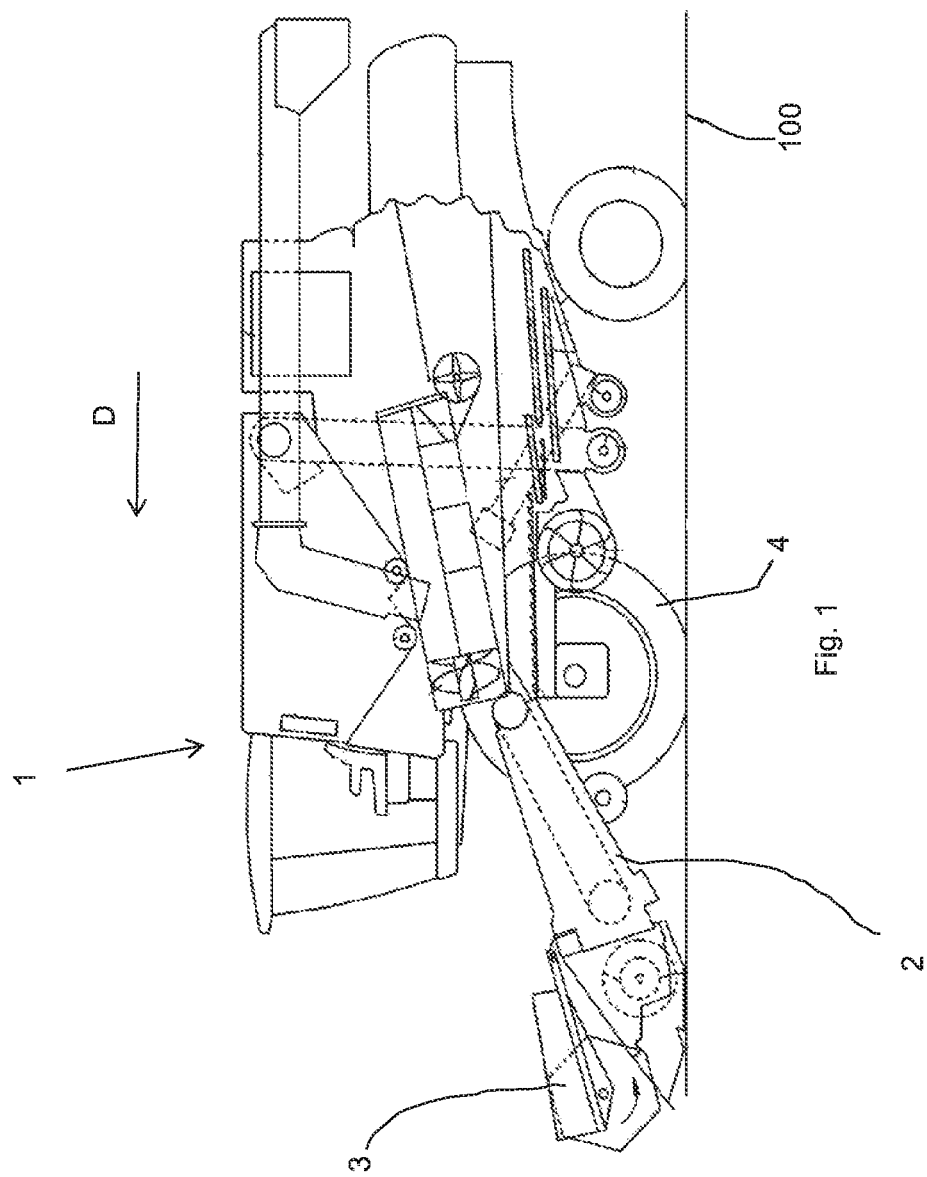
FIG. 1: illustrates an example of an agricultural harvester which can be used with a harvester header support according to the invention, in side view.

The agricultural harvester 1 further comprises two front wheels 4, one of which is shown in FIG. 1. In an alternative embodiment, the agricultural harvester may comprise a two front tracks instead of the front wheels 4.

The agricultural harvester 1 is adapted to be driven over the ground 100. The ground 100 may for example be a road or a field. The agricultural harvester 1 has a main direction of driving D, which is straight ahead.

FIG. 1 shows the combine harvester in field operation mode, so with the header 3 just above the ground 100. In this position, the header 3 can be used to cut crop from the field.

Figure 2:
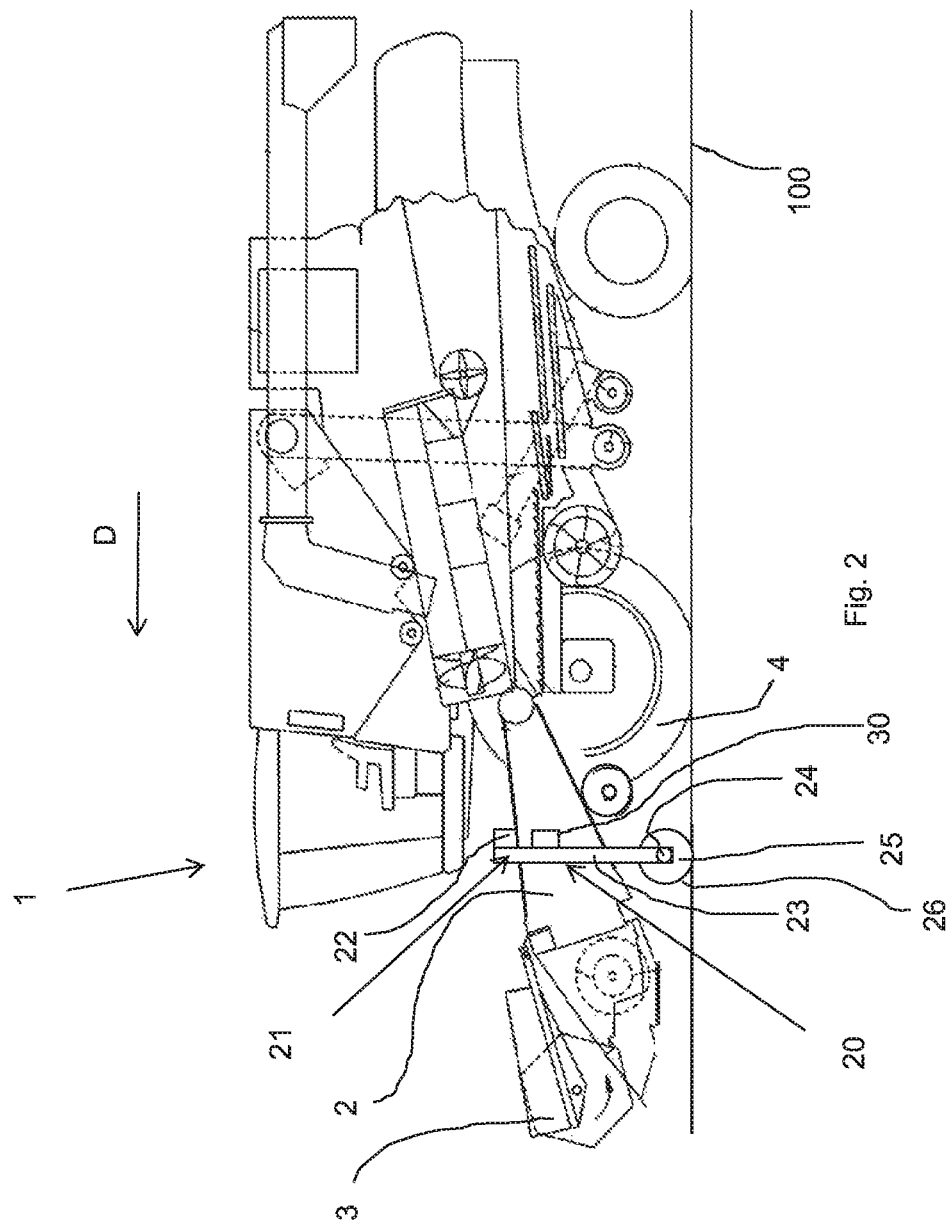
FIG. 2: illustrates an example of a combination of an agricultural harvester with a harvester header support according to the invention, in side view, in road transport mode.

FIG. 2 illustrates an example of a combination of an agricultural harvester 1 with a harvester header support 20 according to the invention, in side view, in road transport mode.

In the embodiment of FIG. 2, in road transport mode the header 3 is lifted above the ground 100 by tilting the feeder 2 upwardly relative to the position of the feeder 2 shown in FIG. 1.

In the embodiment of FIG. 2, the harvester header support 20 is connected to the feeder 2. The harvester header support 20 comprises a frame 21 which comprises a harvester interface 22 and a first arm 23. The first arm 23 is pivotably connected to the harvester interface 22.

The harvester header support 20 further comprises a first support wheel 25. The first support wheel 25 is rotatable about a first rotation axis. The first rotation axis is in this embodiment parallel to the plane of the ground, directed perpendicular to the plane of the drawing. The first support wheel 25 comprises a tread 26, which is adapted to engage the ground 100 when the first support wheel 25 is used during road transport. The frame 21 is adapted to connect the first support wheel 25 to the agricultural harvester 1.

The harvester header support 20 further comprises a first wheel connector 24, which is adapted to connect the first support wheel 25 to the first arm 23 of the frame 21. The first wheel connector 24 allows the first support wheel 25 to rotate about the first rotation axis.

The harvester header support further comprises an arm drive 30, which is adapted to pivot the first arm 23 relative to the harvester interface 22. The arm drive 30 is adapted to transfer the harvester header support 20 from the road transport mode into the field operation mode and/or vice versa. Optionally, this involves moving, e.g. pivoting, the first arm 23 of the frame 21 relative to the harvester interface 22. In a possible embodiment, the arm drive 30 is adapted to transfer the harvester header support from the road transport mode into the field operation mode as well as from the field operation mode into the road transport mode. Alternatively, one of these transfers is effected partly or entirely by gravity.

In the road transport mode, the first support wheel 25 is in a road transport position. The road transport position allows the first support wheel 25 to bear at least a part of the weight of the header 3. In the road transport position, the tread 26 of the first support wheel 25 will usually engage the ground 100. In the road transport mode, the first rotation axis of the first support 25 wheel extends in a substantially horizontal plane. FIG. 2 shows the first support wheel 25 in the road transport position.

Figure 3:
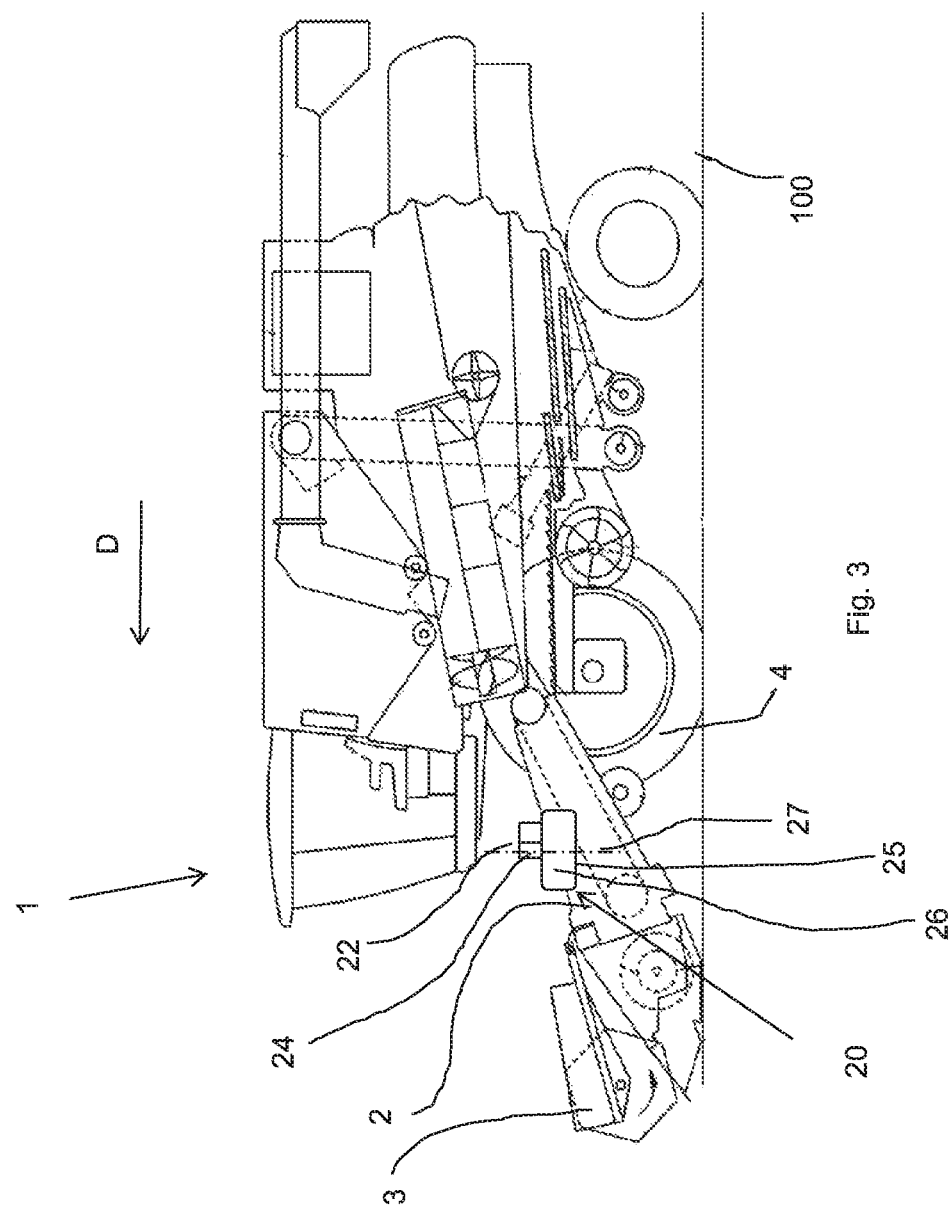
FIG. 3: illustrates the combination of an agricultural harvester with a harvester header support of FIG. 2, in side view, in field operation mode.

FIG. 3 illustrates the combination of an agricultural harvester 1 with a harvester header support 20 of FIG. 2, in side view, in field operation mode.

In field operation mode, the first support wheel 25 is in a field operation position in which the first support wheel is free from the weight of the header 3. In the field operation position, the first rotation axis 27 of the first support wheel 25 extends in a substantially vertical plane.

Figure 4:
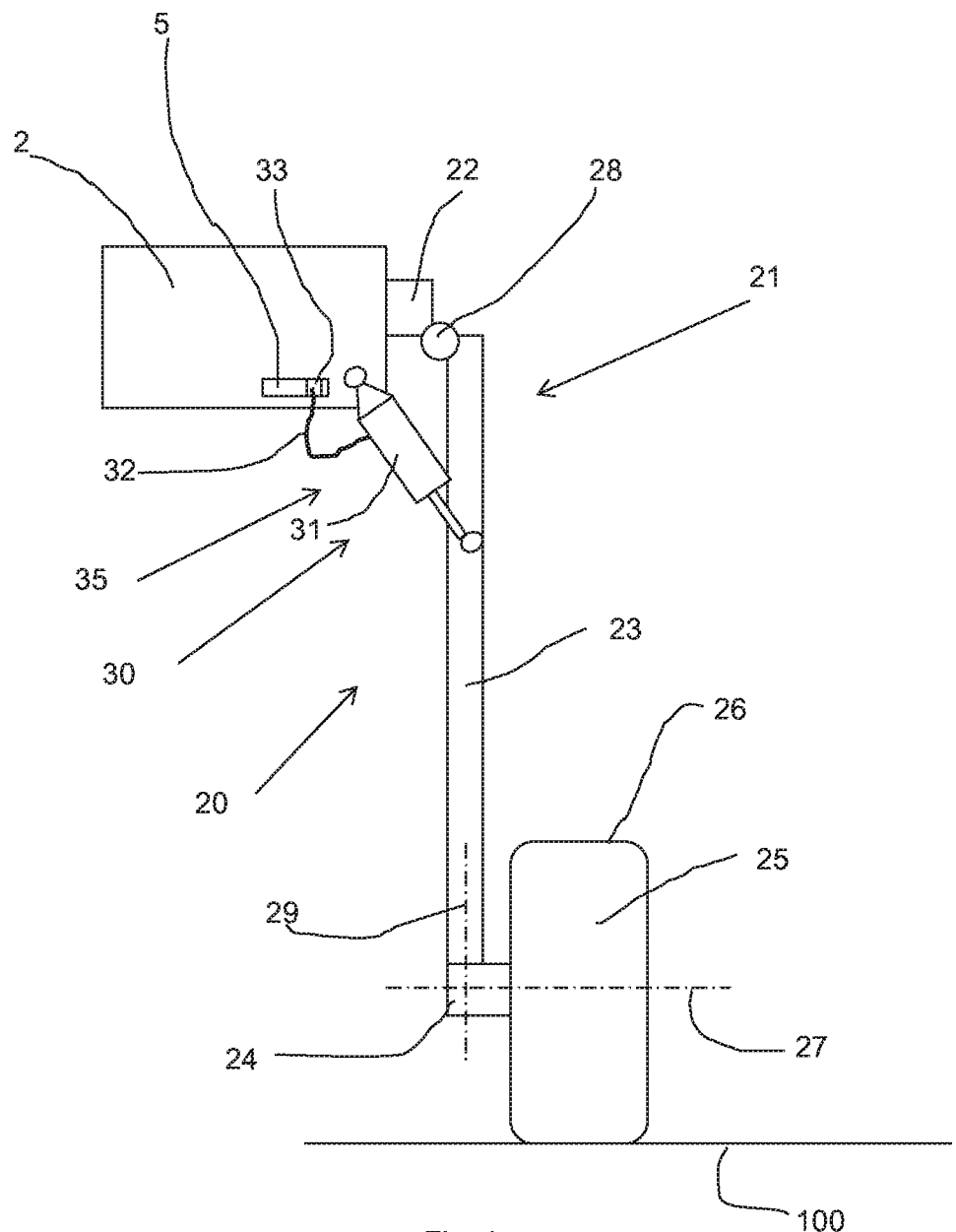
FIG. 4: illustrates a first embodiment of a harvester header support according to the invention, in road transportation mode, in front view.

FIG. 4 illustrates a first embodiment of a harvester header support according to the invention, in road transportation mode, in front view.

In the embodiment of FIG. 4 the harvester header support 20 is shown in a situation in which it is connected to a side wall of the feeder 2. The harvester header support 20 comprises a frame 21 which comprises a harvester interface 22 and a first arm 23. The first arm 23 is pivotably connected to the harvester interface 22 via pivot 28, defining a first arm pivot axis that is parallel with the driving direction D.

The harvester header support 20 further comprises a first support wheel 25. The first support wheel 25 is rotatable about a first rotation axis 27. The first support wheel 25 comprises a tread 26, which is adapted to engage the ground 100 when the first support wheel 25 is used during road transport. The frame 21 is adapted to connect the first support wheel 25 to the agricultural harvester 1.

The harvester header support 20 further comprises a first wheel connector 24, which is adapted to connect the first support wheel 25 to the first arm 23 of the frame 21. The first wheel connector 24 allows the first support wheel 25 to rotate about the first rotation axis 27.

The harvester header support further comprises an arm drive 30, which is adapted to pivot the first arm 23 relative to the harvester interface 22. The arm drive 30 is adapted to transfer the harvester header support 20 from the road transport mode into the field operation mode and/or vice versa. Optionally, this involves moving, e.g. pivoting, the first arm 23 of the frame 21 relative to the harvester interface 22 via pivot 28. In a possible embodiment, the arm drive 30 is adapted to transfer the harvester header support from the road transport mode into the field operation mode as well as from the field operation mode into the road transport mode. Alternatively, one of these transfers is effected partly or entirely by gravity.

In the road transport mode, the first support wheel 25 is in a road transport position. The road transport position allows the first support wheel 25 to bear at least a part of the weight of the header 3. In the road transport position, the tread 26 of the first support wheel 25 will usually engage the ground 100. In the road transport mode, the first rotation axis of the first support 25 wheel extends in a substantially horizontal plane. FIG. 4 shows the first support wheel 25 in the road transport position.

In the embodiment of FIG. 4, the first wheel connector 24 is adapted to allow pivoting of the first support wheel 25 about a pivot axis 29. In the road transport mode, which is shown in FIG. 4, the pivot axis extends in a substantially vertical plane. This allows the first support wheel 25 to follow steering movements on the road of the agricultural harvester to which the harvester header support is connected in use.

Optionally, the first wheel connector 24 is adapted to allow pivoting of the first support wheel 25 about the pivot axis 29 over a pivot angle which is 10° or less, preferably 5° or less, optionally 3° or less.

In the embodiment of FIG. 4, the arm drive 30 comprises a hydraulic assembly 35. The hydraulic assembly 35 comprises a hydraulic cylinder 31 and a fluid line system 32 for feeding hydraulic fluid to the hydraulic cylinder 31 and receiving hydraulic fluid from the hydraulic cylinder 31. The fluid line system 32 optionally comprises a plurality of fluid lines. The fluid line system 32 comprises a hydraulic connector 33 The hydraulic connector 33 is adapted to connect the fluid line system 32 to a hydraulic system 5 of the agricultural harvester, which is only schematically shown in FIG. 4.

An agricultural harvester typically has an hydraulic system 5 on board. In this embodiment, the hydraulic system 5 of the agricultural harvester can be used to operate the arm drive 30 of the harvester header support 20.

Figure 5:
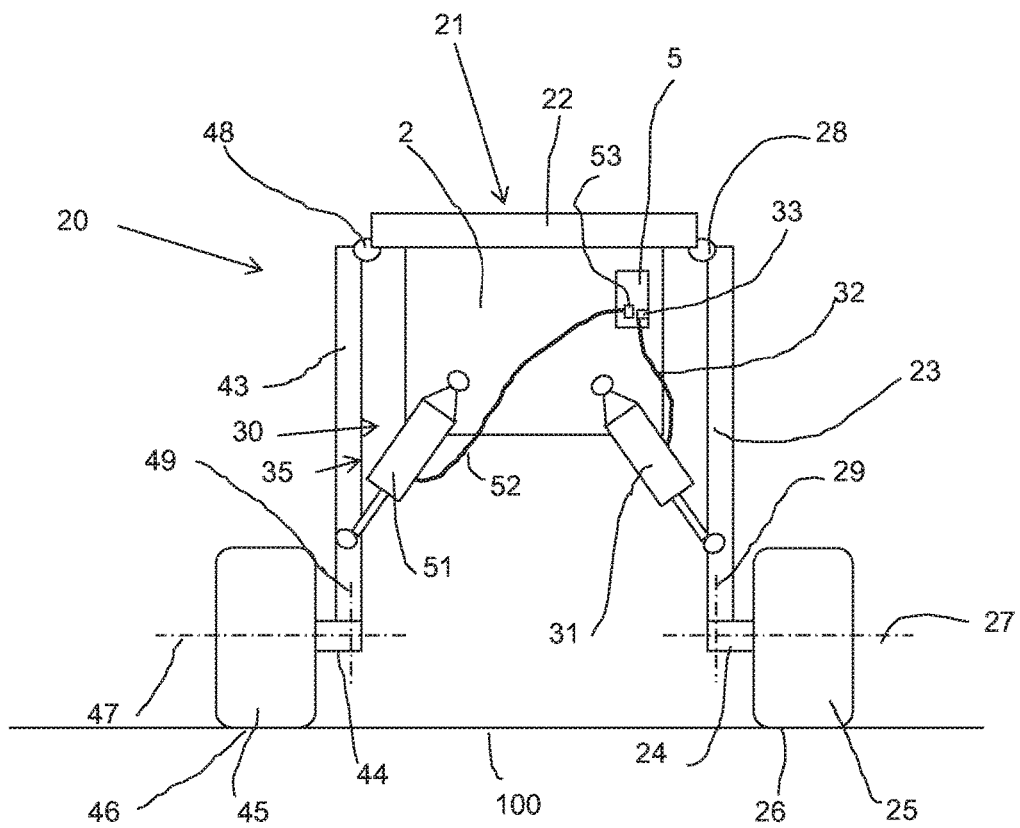
FIG. 5: illustrates a second embodiment of a harvester header support according to the invention, in road transportation mode, in front view.

FIG. 5 illustrates a second embodiment of a harvester header support 20 according to the invention, in road transportation mode, in front view.

In the embodiment of FIG. 5 the harvester header support 20 is shown in a situation in which it is connected to a top wall of the feeder 2. The harvester header support 20 comprises a frame 21 which comprises a harvester interface 22 and a first arm 23. The first arm 23 is pivotably connected to the harvester interface 22 via pivot 28.

The harvester header support 20 further comprises a first support wheel 25. The first support wheel 25 is rotatable about a first rotation axis 27. The first support wheel 25 comprises a tread 26, which is adapted to engage the ground 100 when the first support wheel 25 is used during road transport. The frame 21 is adapted to connect the first support wheel 25 to the agricultural harvester 1.

The harvester header support 20 further comprises a first wheel connector 24, which is adapted to connect the first support wheel 25 to the first arm 23 of the frame 21. The first wheel connector 24 allows the first support wheel 25 to rotate about the first rotation axis 27.

The harvester header support further comprises an arm drive 30, which is adapted to pivot the first arm 23 relative to the harvester interface 22. The arm drive 30 is adapted to transfer the harvester header support 20 from the road transport mode into the field operation mode and/or vice versa. Optionally, this involves moving, e.g. pivoting, the first arm 23 of the frame 21 relative to the harvester interface 22 via pivot 28. In a possible embodiment, the arm drive 30 is adapted to transfer the harvester header support from the road transport mode into the field operation mode as well as from the field operation mode into the road transport mode. Alternatively, one of these transfers is effected partly or entirely by gravity.

In the road transport mode, the first support wheel 25 is in a road transport position. The road transport position allows the first support wheel 25 to bear a part of the weight of the header 3. In the road transport position, the tread 26 of the first support wheel 25 will usually engage the ground 100. In the road transport mode, the first rotation axis of the first support 25 wheel extends in a substantially horizontal plane. FIG. 5 shows the first support wheel 25 in the road transport position.

In the embodiment of FIG. 5, the frame 21 further comprises a second arm 43, which is pivotably connected to the harvester interface 22 via pivot 48, defining a second arm pivot axis that is parallel with the driving direction D.

In the embodiment of FIG. 5, the harvester header support 20 further comprises a second support wheel 45. The second support wheel 45 comprises a second rotation axis 47 and a tread 46. The second support wheel 45 is rotatable around the second rotation axis 47.

In the embodiment of FIG. 5, the harvester header support 20 further comprises a second wheel connector 44. The second wheel connector 44 is adapted to connect the second support wheel 45 to the second arm 43 of the frame 21, while allowing the second support wheel 45 to rotate about the second rotation axis 47.

In the road transport mode, the second support wheel 45 is in a road transport position which allows the second support wheel 45 to bear a part of the weight of the header. In the road transport position the second rotation axis 47 of the second support wheel 45 extends in a substantially horizontal plane. FIG. 5 shows the second support wheel in the road transport position. In the road transport position, the tread 46 of the second support wheel 45 will usually engage the ground 100.

In the embodiment of FIG. 5, the first wheel connector 24 is adapted to allow pivoting of the first support wheel 25 about a pivot axis 29. In the road transport mode, which is shown in FIG. 5, the pivot axis 29 extends in a substantially vertical plane. This allows the first support wheel 25 to follow steering movements on the road of the agricultural harvester to which the harvester header support 20 is connected in use.

Optionally, the first wheel connector 24 is adapted to allow pivoting of the first support wheel 25 about the pivot axis 29 over a pivot angle which is 10° or less, preferably 5° or less, optionally 3° or less.

Likewise, the second wheel connector 44 is adapted to allow pivoting of the second support wheel 45 about a pivot axis 49. In the road transport mode, which is shown in FIG. 5, the pivot axis 49 extends in a substantially vertical plane. This allows the second support wheel 45 to follow steering movements on the road of the agricultural harvester to which the harvester header support 20 is connected in use.

Optionally, the second wheel connector 44 is adapted to allow pivoting of the second support wheel 45 about the pivot axis 49 over a pivot angle which is 10° or less, preferably 5° or less, optionally 3° or less.

In the embodiment of FIG. 5, the arm drive 30 comprises a hydraulic assembly 35. The hydraulic assembly 35 comprises a first hydraulic cylinder 31, a second hydraulic cylinder, a first fluid line system 32 for feeding hydraulic fluid to the first hydraulic cylinder 31 and receiving hydraulic fluid from the hydraulic cylinder 31, and a second fluid line system 52 for feeding hydraulic fluid to the second hydraulic cylinder 51 and receiving hydraulic fluid from the second hydraulic cylinder 51. The fluid line systems 32, 52 each optionally comprise a plurality of fluid lines. The first fluid line system 32 comprises a hydraulic connector 33, and the second fluid line system 52 comprises a hydraulic connector 53. The hydraulic connectors 33, 53 are adapted to connect the fluid line systems 32, 52 to a hydraulic system 5 of the agricultural harvester, which is only schematically shown in FIG. 5.

An agricultural harvester typically has an hydraulic system 5 on board. In this embodiment, the hydraulic system 5 of the agricultural harvester can be used to operate the arm drive 30 of the harvester header support 20.

Optionally, in the embodiment of FIG. 5, in the road transport position the distance between the first support wheel and the second support wheel is 3.5 meters or less.

Figure 6:
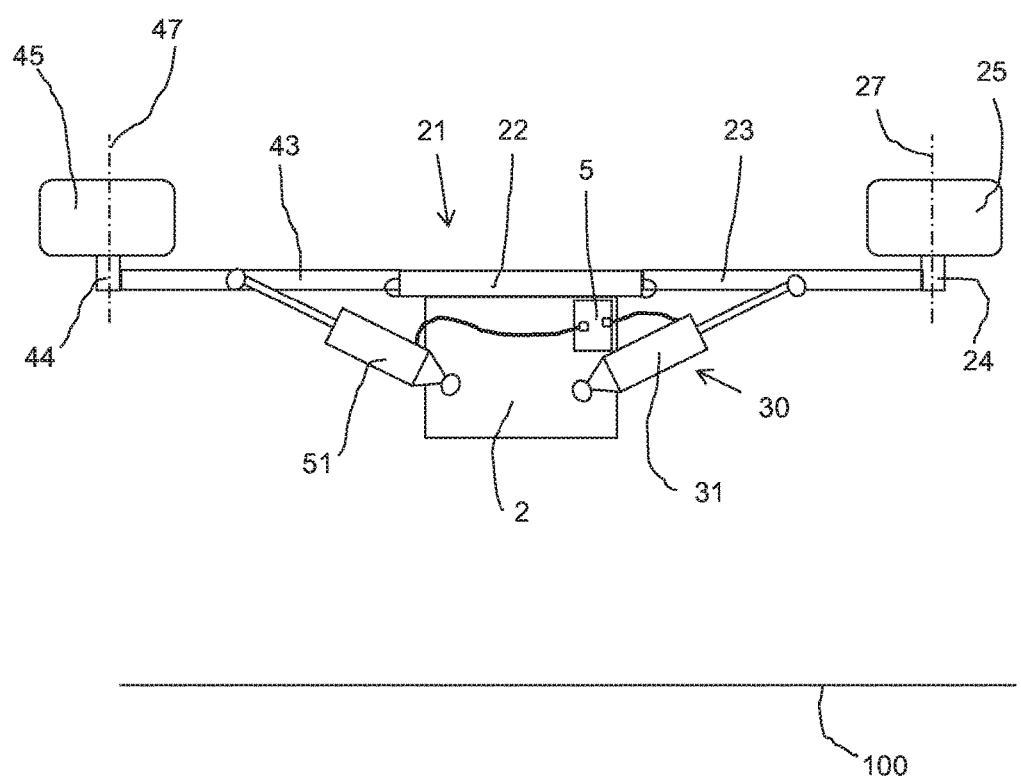
FIG. 6: illustrates the embodiment of FIG. 5, in field operation mode, in front view.

FIG. 6 illustrates the embodiment of FIG. 5, in field operation mode, in front view.

In field operation mode, the first support wheel 25 is in a field operation position in which the first support wheel is free from the weight of the header. In the field operation position, the first rotation axis 27 of the first support wheel 25 extends in a substantially vertical plane. In this embodiment, the first support wheel 25 is not be in contact with the ground 100. In the field operation position, the first support wheel 25 is arranged at a distance above the ground 100.

Likewise, the second support wheel 45 is in a field operation position in which the second support wheel 45 is free from the weight of the header. In the field operation position, the second rotation axis 47 of the second support wheel 45 extends in a substantially vertical plane. In this embodiment, the second support wheel 45 is not be in contact with the ground 100. In the field operation position, the second support wheel 45 is arranged at a distance above the ground 100.

Figure 7:
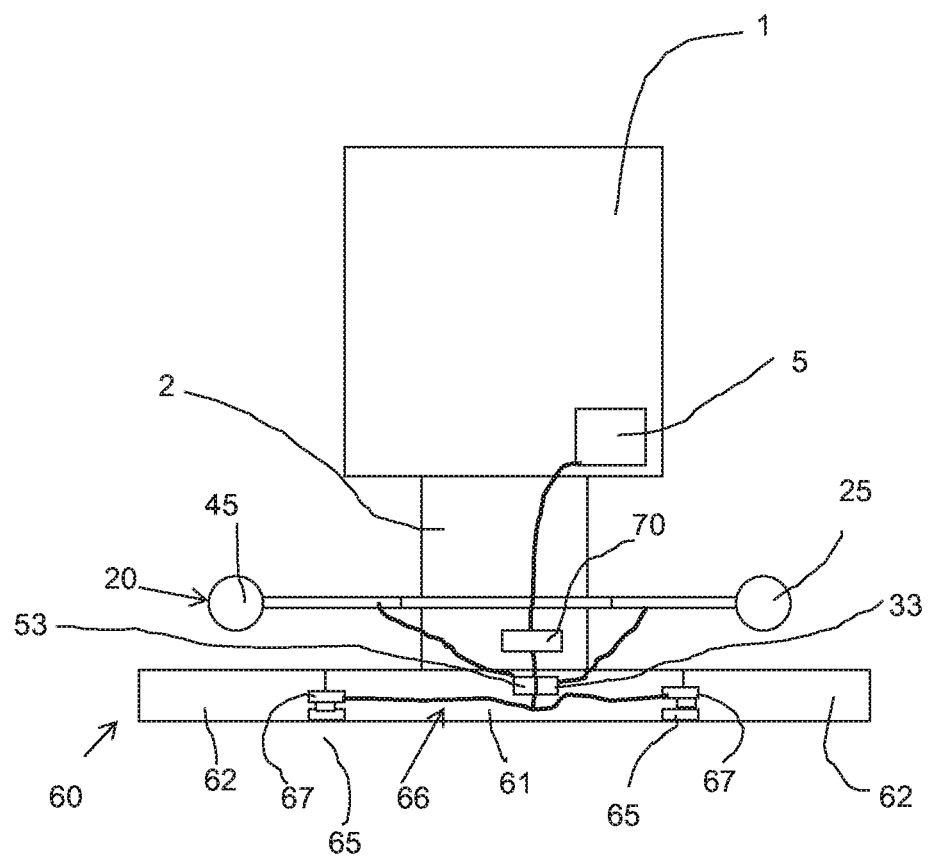
FIG. 7: illustrates an embodiment of a combination of a harvester header support with an agricultural harvester which comprises a foldable header, in top view.

FIG. 7 illustrates an embodiment of a combination of a harvester header support 20 with an agricultural harvester 1 which comprises a foldable header 60, in top view. The harvester header support 20 is shown in field operation mode, and the foldable header in unfolded mode.

In the embodiment of FIG. 7, the agricultural harvester 1 comprises a foldable header 60. The foldable header 60 comprises a central portion 61 and two lateral portions 62, one arranged on the right side and the other one arranged on the left side of the central portion 61. The lateral portions 62 are pivotably connected to the central portion 61.

The foldable header 60 has an unfolded mode and a folded mode. In the unfolded mode, the foldable header 60 is adapted to be operated for harvesting crop. The lateral portions 62 extend in line with the central portion 61 and the header 60 is rather wide. In the folded mode, foldable header is adapted for road transport, and the lateral portions 62 do not extend in line with the central portion 61. For example, the lateral portions 62 are pivoted upwardly. In the folded mode, the header is less wide than in the unfolded mode. This facilitates road transport.

The foldable header 60 comprises a folding device 65 for bringing the foldable header from the folded mode into the unfolded mode and/or vice versa, and a hydraulic actuator 66 system for operating the folding device 65. In the embodiment of FIG. 7, two hydraulic cylinders are provided in the hydraulic actuator system.

Either the hydraulic system of the agricultural harvester 1 or hydraulic actuator system 66 of the foldable header 60 comprises a header folding control valve 70 which is adapted to actuate the folding device.

In the embodiment shown in FIG. 7, an embodiment of the harvester header support 20 as shown in FIG. 5 and FIG. 6 is applied.

As is shown in FIG. 5 and FIG. 6, the arm drive 30 of the harvester header support comprises a hydraulic assembly 35, which hydraulic assembly comprises a hydraulic cylinder 31, 51 and a fluid line system 32, 52 for feeding hydraulic fluid to the hydraulic cylinder 31, 51 and receiving hydraulic fluid from the hydraulic cylinder 31, 51. The fluid line system 32, 52 comprises a hydraulic connector 33, 53.

In the embodiment of FIG. 7, the hydraulic connectors 53,53 of the harvester header support 20 are connected to the hydraulic actuating system at a location between the header folding control valve 70 and the folding device 65.

The invention claimed is:

1. A harvester header support for supporting a header of an agricultural harvester, moveable in a driving direction, during road transport, the harvester header support comprising:
a frame comprising:
a harvester interface connectable to an agricultural harvester; and
a first arm pivotably connected to the harvester interface at a first arm pivot axis that is parallel with the driving direction;
a first support wheel comprising a first rotation axis and a tread, which first support wheel is rotatable around the first rotation axis;
a first wheel connector adapted to connect the first support wheel to the first arm of the frame, while allowing the first support wheel to rotate about the first rotation axis, and
an arm drive adapted to pivot the first arm relative to the harvester interface,
wherein the harvester header support has a road transport mode and a field operation mode,
wherein the arm drive is adapted to transfer the harvester header support from the road transport mode to the field operation mode or from the field operation mode to the road transport mode,
wherein when in the transport mode, the first support wheel is in a road transport position which allows the first support wheel to bear at least a part of the weight of the header, in which road transport position the first rotation axis of the first support wheel extends in a substantially horizontal plane, and
wherein when in the field operation mode, the first support wheel is in a field operation position in which the first support wheel is free from the weight of the header and the first rotation axis of the first support wheel extends in a substantially vertical plane.

2. The harvester header support according to claim 1, wherein the first wheel connector is adapted to allow pivoting of the first support wheel about a pivot axis, which extends in a substantially vertical plane when the harvester header support is in the road transport mode.

3. The harvester header support according to claim 2, wherein the first wheel connector is adapted to allow pivoting of the first support wheel about the pivot axis over a pivot angle which is 10° or less.

4. The harvester header support according to claim 1, wherein the arm drive comprises a hydraulic assembly comprising a hydraulic cylinder and a fluid line system for feeding hydraulic fluid to the hydraulic cylinder and receiving hydraulic fluid from the hydraulic cylinder, wherein the fluid line system comprises a hydraulic connector adapted to connect the fluid line system to a hydraulic system of the agricultural harvester.

5. The harvester header support according to claim 1, wherein the frame further comprises a second arm pivotably connected to the harvester interface at a second arm pivot axis that is parallel with the driving direction, and wherein the harvester header support further comprises:
a second support wheel comprising a second rotation axis and a tread, which second support wheel is rotatable around the second rotation axis, and
a second wheel connector adapted to connect the second support wheel to the second arm of the frame, while allowing the second support wheel to rotate about the second rotation axis, and
wherein when in the road transport mode, the second support wheel is in a road transport position which allows the second support wheel to bear at least a part of the weight of the header, and in which road transport position the second rotation axis of the second support wheel extends in a substantially horizontal plane, and
wherein when in the field operation mode, the second support wheel is in a field operation position in which the second support wheel is free from the weight of the header and the second rotation axis of the second support wheel extends in a substantially vertical plane.

6. The harvester header support according to claim 5, wherein in the road transport position a distance between the first support wheel and the second support wheel is 3.5 meters maximum, and wherein in the field operation position, the distance between the first support wheel and the second support wheel is larger than the distance between the first support wheel and the second support wheel in the road transport mode.

7. An agricultural harvester, moveable in a driving direction, comprising:
a header;
a harvester header support for supporting the header during road transport, the harvester header support comprising:
a frame comprising:
a harvester interface connectable to an agricultural harvester; and
a first arm pivotably connected to the harvester interface at a first arm pivot axis that is parallel with the driving direction;
a first support wheel comprising a first rotation axis and a tread, which first support wheel is rotatable around the first rotation axis;
a first wheel connector adapted to connect the first support wheel to the first arm of the frame, while allowing the first support wheel to rotate about the first rotation axis, and
an arm drive adapted to pivot the first arm relative to the harvester interface,
wherein the harvester header support has a road transport mode and a field operation mode,
wherein the arm drive is adapted to transfer the harvester header support from the road transport mode to the field operation mode or from the field operation mode to the road transport mode,
wherein when in the transport mode, the first support wheel is in a road transport position which allows the first support wheel to bear at least a part of the weight of the header, in which road transport position the first rotation axis of the first support wheel extends in a substantially horizontal plane, and
wherein when in the field operation mode, the first support wheel is in a field operation position in which the first support wheel is free from the weight of the header and the first rotation axis of the first support wheel extends in a substantially vertical plane; and
a front wheel or front track,
wherein in the road transport mode, the first support wheel is arranged in front of the front wheel or front track.

8. The agricultural harvester according to claim 7, wherein the agricultural harvester comprises a hydraulic system, and
wherein the arm drive of the harvester header support comprises a hydraulic assembly comprising a hydraulic cylinder and a fluid line system for feeding hydraulic fluid to the hydraulic cylinder and receiving hydraulic fluid from the hydraulic cylinder, which fluid line system comprises a hydraulic connector connected to the hydraulic system of the agricultural harvester.

9. The agricultural harvester according to claim 8, further comprising a foldable header having an unfolded mode in which the foldable header is adapted to be operated for harvesting crop and a folded mode in which the foldable header is adapted for road transport, which foldable header comprises a folding device for bringing the foldable header from the folded mode to the unfolded mode for from the unfolded mode to the folded mode,
wherein the hydraulic system of the agricultural harvester comprises a header folding control valve which is adapted to actuate the folding device, and
wherein the hydraulic connector is connected to the hydraulic system of the agricultural harvester at a location between the header folding control valve and the folding device.

10. The agricultural harvester according to claim 7, wherein the harvester header support is a first harvester header support, wherein the agricultural harvester further comprises a second header harvester support comprising a second support wheel, and wherein the first support wheel of the first harvester header support is located on a right side of the agricultural harvester and the second support wheel of the second harvester header support is located on a left side of the agricultural harvester.

11. The agricultural harvester according to claim 7,
wherein the frame of the harvester header support further comprises a second arm, which is pivotably connected to the harvester interface at a second arm pivot axis that is parallel with the driving direction, and
wherein the harvester header support further comprises:
a second support wheel comprising a second rotation axis and a tread, which second support wheel is rotatable around the second rotation axis; and
a second wheel connector adapted to connect the second support wheel to the second arm of the frame, while allowing the second support wheel to rotate about the second rotation axis, and
wherein when in the transport mode, the second support wheel is in a road transport position which allows the second support wheel to bear at least a part of the weight of the header, and in which road transport position the second rotation axis of the second support wheel extends in a substantially horizontal plane,
wherein when in the field operation mode, the second support wheel is in a field operation position in which the second support wheel is free from the weight of the header and the second rotation axis of the second support wheel extends in a substantially vertical plane, and
wherein the first support wheel is located on a right side of the agricultural harvester and the second support wheel is located on a left side of the agricultural harvester.

12. An agricultural harvester, moveable in a driving direction, comprising:
a foldable header having an unfolded mode in which the foldable header is adapted to be operated for harvesting crop and a folded mode in which the foldable header is adapted for road transport, the foldable header comprising a folding device for bringing the foldable header from the folded mode to the unfolded mode and from the unfolded mode to the folded mode, the foldable header further comprising a hydraulic actuator system for operating the folding device, the hydraulic actuator system comprising a header folding control valve adapted to actuate the folding device, and; and
a header support for supporting the foldable header during road transport, the header support comprising:
a frame comprising:
a harvester interface connected to the agricultural harvester; and
a first arm pivotably connected to the harvester interface at a first arm pivot axis that is parallel with the driving direction;
a first support wheel comprising a first rotation axis and a tread, which first support wheel is rotatable around the first rotation axis;
a first wheel connector adapted to connect the first support wheel to the first arm of the frame, while allowing the first support wheel to rotate about the first rotation axis, and
an arm drive adapted to pivot the first arm relative to the harvester interface, the arm drive comprising a hydraulic assembly comprising a hydraulic cylinder and a fluid line system for feeding hydraulic fluid to the hydraulic cylinder and receiving hydraulic fluid from the hydraulic cylinder, the fluid line system comprising a hydraulic connector connected to the hydraulic actuating system at a location between the header folding control valve and the folding device,
wherein the header support has a road transport mode and a field operation mode,
wherein the arm drive is adapted to transfer the header support from the road transport mode to the field operation mode or from the field operation mode to the road transport mode,
wherein when in the transport mode, the first support wheel is in a road transport position which allows the first support wheel to bear at least a part of the weight of the header, in which road transport position the first rotation axis of the first support wheel extends in a substantially horizontal plane, and
wherein when in the field operation mode, the first support wheel is in a field operation position in which the first support wheel is free from the weight of the header and the first rotation axis of the first support wheel extends in a substantially vertical plane.

* * * * *